(12) United States Patent
Tanaka et al.

(10) Patent No.: US 6,341,037 B1
(45) Date of Patent: Jan. 22, 2002

(54) POSITIONING STAGE

(75) Inventors: Shoichi Tanaka; Hidekazu Sano, both of Kawasaki (JP)

(73) Assignee: Mitutoyo Corporation, Kawasaki (JP)

(*) Notice: Subject to any disclaimer, the term of this patent is extended or adjusted under 35 U.S.C. 154(b) by 0 days.

(21) Appl. No.: 09/641,920

(22) Filed: Aug. 21, 2000

(30) Foreign Application Priority Data

Aug. 24, 1999 (JP) .......................................... 11-236884

(51) Int. Cl.[7] .............................................. G02B 21/26
(52) U.S. Cl. ........................ 359/393; 359/368; 359/391
(58) Field of Search .................................. 359/368, 900, 359/391–394; 74/89.22, 490.09, 490.13

(56) References Cited

U.S. PATENT DOCUMENTS 5,802,925 A * 9/1998 Kanao ..................... 74/490.13
5,831,764 A * 11/1998 Brinkmann et al. ......... 359/392
5,901,607 A * 5/1999 Kimura ...................... 74/89.22
6,018,415 A * 1/2000 Woo et al. .................. 359/393

FOREIGN PATENT DOCUMENTS

| JP | A-4-31814 | 2/1992 |
| JP | B2-7-1340 | 1/1995 |
| JP | A-9-113814 | 5/1997 |

* cited by examiner

Primary Examiner—Thong Nguyen
(74) Attorney, Agent, or Firm—Oliff & Berridge, PLC

(57) ABSTRACT

A feeding mechanism for moving a table relative to a base has a pair of pulley (301, 302, 401, 402) supported by either one of the table (21) and the base (22), a loop-shaped belt (303, 403) stretched between the pulleys and having a part thereof extending in a movement direction of the relative movement, a joint (304, 404) for connecting the other one of the table and the base with the belt, and a pinch mechanism (310, 410) provided to the either one of the table and the base to hold a part of the belt.

8 Claims, 6 Drawing Sheets

POSITIONING STAGE

BACKGROUND OF THE INVENTION

1. Field of the Invention

The present invention relates to a positioning stage. More specifically, it relates to a mechanism for an accurate movement control while resting a workpiece thereon during accurate measurement by microscope inspection, optical measurement etc.

2. Description of Related Art

Conventionally, during microscope inspection etc., a workpiece is put on a cross-travel stage and is moved so that a portion of interest comes within a predetermined measurement area located on an extension of an objective. For measurement, the portion of interest has to be accurately moved little by little.

In view of the above requirement, the portion of the stage for the workpiece to be put on is arranged to be movable in X and Y directions and a driving mechanism capable of accurate feeding movement little by little is provided to control movement thereof.

For such driving mechanism of the stage, a rack-and-pinion mechanism and a feeding mechanism using a rail and a friction gear can be used. However, on account of problem relating to accuracy and movement smoothness, another type of feeding mechanism using a belt and a pulley recently comes into use (see Japanese Patent Publication No. Hei 7-1340, Japanese Patent Laid-Open Publication No. Hei 4-31814 and Japanese Patent Laid-Open Publication No. Hei 9-113814).

The feeding mechanism with a belt and a pulley, for moving a table for a workpiece to be put on relative to a base, has a pair of pulley supported on, for instance, a base side and an endless belt is wound between the pulleys. One table is supported movably relative to the base and is associated with a part of the belt through a joint. Ordinarily, the table is supported by a guide rail for guiding the table in an extension direction of the belt.

A manipulation knob is connected to a shaft of one of the pulleys and the pulley is rotated by rotating the knob, thus circulatingly rotating the endless belt stretched therearound. By thus feeding the belt, the table associated with a joint is also fed, thus feeding the table by the knob.

Incidentally, for quickly feeding the table by directly holding the table in adjusting the portion of interest to the measurement area, a clutch mechanism etc. for releasing the feeding mechanism composed of the belt and the pulley is provided. Ordinarily, the joint of the table relative to the belt is released. Specifically, the joint is fixed and released at any position of the belt.

According to the above-described conventional feeding mechanism by the belt and the pulley, following problems arise.

First, it is difficult to simplify the structure of the feeding mechanism and to reduce a size thereof.

In other words, tension has to be applied to the belt to eliminate a slack of the belt and further strong tension is necessary for driving the belt by the pulley. Specifically, in order to transfer the rotation of the pulley to the belt, a predetermined friction is necessary between the pulley and the belt, and further strong tension is necessary for the belt to satisfy the requirement. Accordingly, a structure and strength enough to endure the strong tension of the belt is necessary for the pulley, rotation shaft thereof, support portion thereof etc.

Second, feed of the table cannot be adjusted finely enough.

In other words, since the conventional feeding mechanism by the belt and pulley rotates the pulley by rotating the manipulation knob to drive the belt wound between the pulleys, relationship between a control input of the manipulation knob (circumference thereof) and a feed displacement of the belt (i.e. feed displacement of the table) depends on a radius of the manipulation knob and the pulley. Accordingly, in order to set the feed of the table, the radius of the pulley has to be made small.

However, when the radius of the pulley is reduced, curvature of the belt wound therearound becomes small. And an allowable minimum bend radius for assuring normal operation is determined in advance in view of material thereof. Accordingly, the radius of the pulley cannot be reduced beyond the allowable minimum bend radius, thus unable to sufficiently set the minute feed of the table.

Third, the components cannot be arranged freely enough.

Specifically, in the conventional feeding mechanism by the belt and the pulley, since the manipulation knob is connected to the shaft of the pulley, the disposition of the components is restricted by the position of the pulley. Operability of the manipulation knob is not so good because the pulley is ordinarily disposed at both ends of the stretched belt (end of the feeding mechanism). However, as described above, since the location is restricted by the position of the pulley, it cannot be easily changed. Though the position can be changed using other transmission means, the mechanism can be so complicated.

Further, the feeding mechanism by the belt and the pulley may be provided in crosswise two directions for moving biaxially, i.e. X and Y-axis directions in the conventional stage drive mechanism. Further, for improving operability, the manipulation knob of respective shafts is formed in coaxial double cylindrical shape. However, as described above, the location of the manipulation knob is restricted by the pulley position at the end of the feeding mechanism, and the respective manipulation knobs have to be adjusted at the same position in order to form the manipulation knob in the double cylindrical form. Accordingly, the feeding mechanism of respective directions is only allowed to cross at the end thereof. More specifically, the feeding mechanism can only be disposed at a periphery of respective tables and the space at central portion cannot be used.

SUMMARY OF THE INVENTION

An object of the present invention is to provide a positioning stage capable of simplifying and size-reducing a structure thereof, improving feeding accuracy of the table and freely arranging respective components.

The present invention is a positioning stage having: a table for a workpiece to be rested; a base for supporting the table; and a feeding mechanism interposed between the table and the base for moving the table relative to the base in a predetermined movement direction along a surface of the table, in which the feeding mechanism has: a pair of pulley supported by either one of the table and the base; a loop-shaped drive force transmission member stretched between the pair of pulley, at least a part of the drive force transmission member extending in the movement direction; a joint for connecting the other one of the table and the base with a part of the drive force transmission member extending in the movement direction; and a pinch mechanism provided to the either one of the table and the base for holding a part of the drive force transmission member to drive the drive force transmission member.

According to the above arrangement, the drive force transmission member is driven not by the pulley portion but by the pinch mechanism separately provided (a combination of a rotation drive capstan and a pinch roller rotating by being pressed). The pinch mechanism holds the drive force transmission member (belt, wire, chain and other flexible elongated member) to secure transmission of the drive force. Accordingly the strong tension of the drive force transmission member necessary for transmitting the rotation of the pulley to the drive force transmission member is not required, thus size-reducing and simplifying the portion adjacent to the pulley.

Further, since the drive force transmission member is not wound to the roller of the pinch mechanism (driving side, capstan), the allowable minimum bend radius does not influence on the pinch mechanism. Accordingly, the feed can be minutely set by reducing the radius of the roller of the pinch mechanism.

Further, since the pinch mechanism can be disposed to any section of the path of the drive force transmission member, the operation knob etc. for controlling feed operation can be more freely disposed. Further, when the feeding mechanism is provided in two directions crosswise, the feeding mechanism can be crossed at any desired position, thus more freely disposing the feeding mechanism.

In the present invention, the pinch mechanism may preferably have a drive roller (a capstan) and a follower roller (pinch roller) sandwiching the drive force transmission member, and a manipulation knob capable of being rotatably operated from an outside may preferably be connected to the drive roller.

Accordingly, the pinch mechanism can be directly driven, thereby effectively size-reducing and simplifying the structure.

In the present invention, the pinch mechanism may have a release mechanism capable of releasing hold and drive of the drive force transmission member by associating and separating the follower roller relative to the drive roller.

Accordingly, the release mechanism can be constructed with a simple structure utilizing the characteristics of the pinch mechanism.

Incidentally, for associating and separating the follower roller relative to the drive roller of the release mechanism, the follower roller may be supported by a movable plate, one end of the movable plate being rotatably supported and the other end of the movable plate being connected with a cable to be pushed and pulled. For operating the release cable, a release lever may be provided to a manual-operation grip provided to one end of the table so that the cable is pulled by the release lever and is pushed back by a spring.

In the present invention, a sub-table may be interposed between the base and the table, first feeding mechanism may be disposed between the base and the sub-table, and second feeding mechanism may be disposed between the sub-table and the table.

Accordingly, bi-directional movement such as in X and Y-axis directions can be easily conducted.

Incidentally, other guiding mechanism may be additionally disposed between the base and the table and between the sub-table and the table.

Further, it is not requisite that the first and the second feeding mechanism exist between the base and the sub-table and between the sub-table and the table. For instance, the first feeding mechanism may be provided outside the base and the sub-table for relatively moving the base and the sub-table.

In the present invention, the first and the second feeding mechanisms may preferably be disposed in two movement directions mutually crosswise, the feeding mechanisms mutually crossing at an intermediate section thereof.

Accordingly, since the pinch mechanism of the first and the second feeding mechanisms concentrates to one location where the first and the second feeding mechanisms can be controlled, the operability can be improved.

In the present invention, the pinch mechanism of the first and the second feeding mechanism with the movement direction thereof crossed may preferably have a drive roller and a follower roller sandwiching the drive force transmission member, the drive roller of the first and the second feeding mechanisms being coaxially disposed, and a manipulation knob for controllably rotating the respective drive rollers being coaxially formed.

Accordingly, the first and the second feeding mechanisms can be controlled at one location by the coaxial manipulation knob, thus improving operability.

Further, in the present invention, the manipulation knob may preferably have: a stationary shaft; first manipulation tab coaxially and rotatably disposed to the stationary shaft to be connected to one of the drive rollers; second manipulation tab coaxially and rotatably disposed to the stationary shaft to be connected to the other one of the drive rollers; and a holding member interposed between the stationary shaft and either one of the first and the second manipulation tab for applying holding force to hold the first or the second manipulation tab at a current position.

Accordingly, an appropriate holding force is applied to the respective manipulation knobs so that an unprepared movement of the stage caused by vibration etc. can be prevented and an appropriate weight is applied to a minute operation of the stage, thereby facilitating minute operation control.

DETAILED DESCRIPTION OF PREFERRED EMBODIMENT(S)

An embodiment of the present invention will be described below with reference to drawings.

Figure 1:
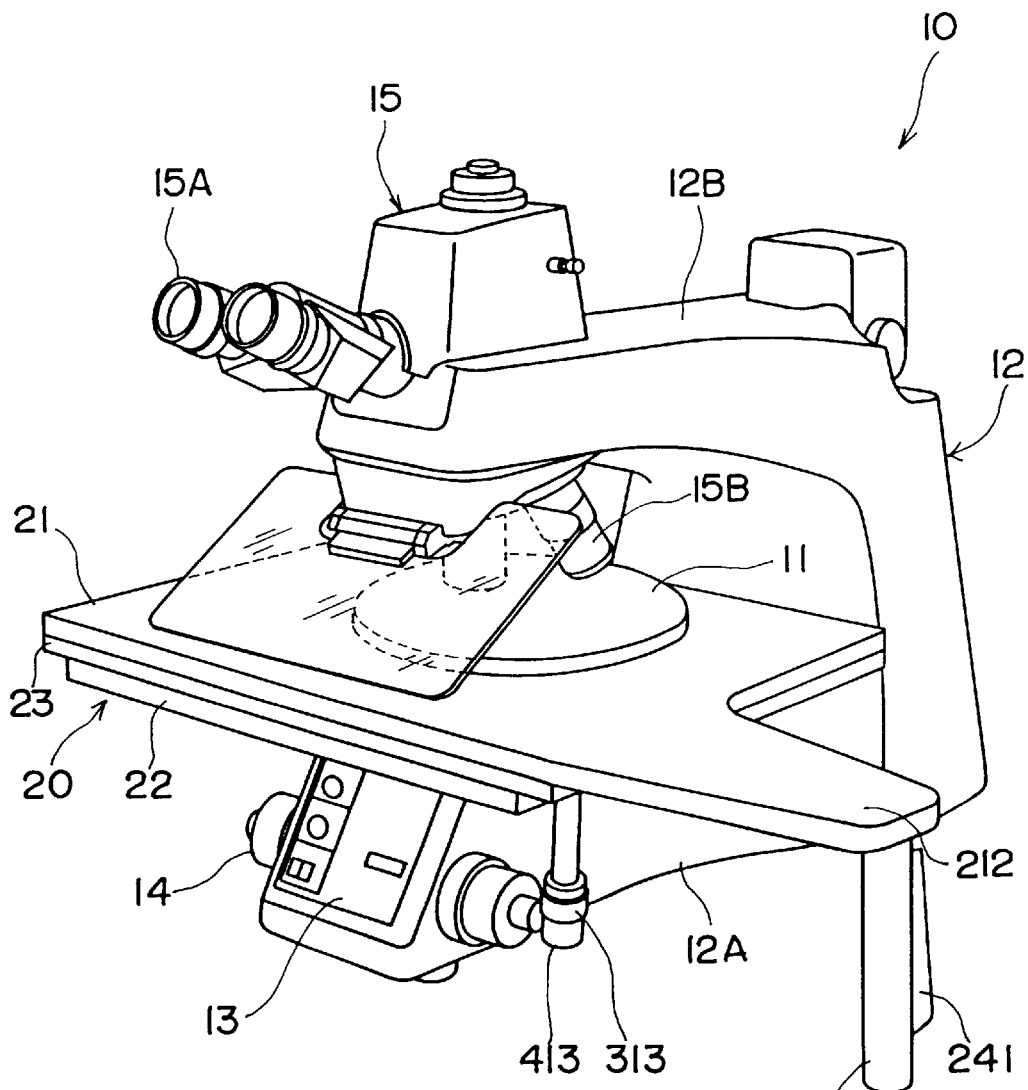
FIG. 1 is a perspective view showing an embodiment of the present invention.

In FIG. 1, a microscope 10 is for detecting surface of a silicon wafer 11 to be measured, and a positioning stage 20 according to the present invention is arranged on a part of the microscope 10 for the wafer 11 to be rested.

The microscope 10 has a body 12 having C-shaped side configuration.

The positioning stage 20 is elevatably provided to a lower portion 12A of the body 12 and the wafer 11 rests on a table 21 formed on an upper side of the positioning stage 20. A control panel 13 including a function switch for illumination etc. is disposed on a front side of the lower portion 12A and an elevation knob 14 for elevating (moving along Z-axis) the positioning stage 20 is provided on a side of the lower portion 12A.

An upper portion 12B of the body 12 is formed to stretch over the table 21, and an optical mechanism 15 is provided at a distal end thereof. The optical mechanism 15 has an eyepiece 15A at a front side thereof and an objective 15B at a lower side thereof, the objective 15B acquiring an image of the wafer 11 on the table 21 which is enlarged to be observed through the eyepiece 15A. The optical function is the same as in existing microscopes.

Figure 2:
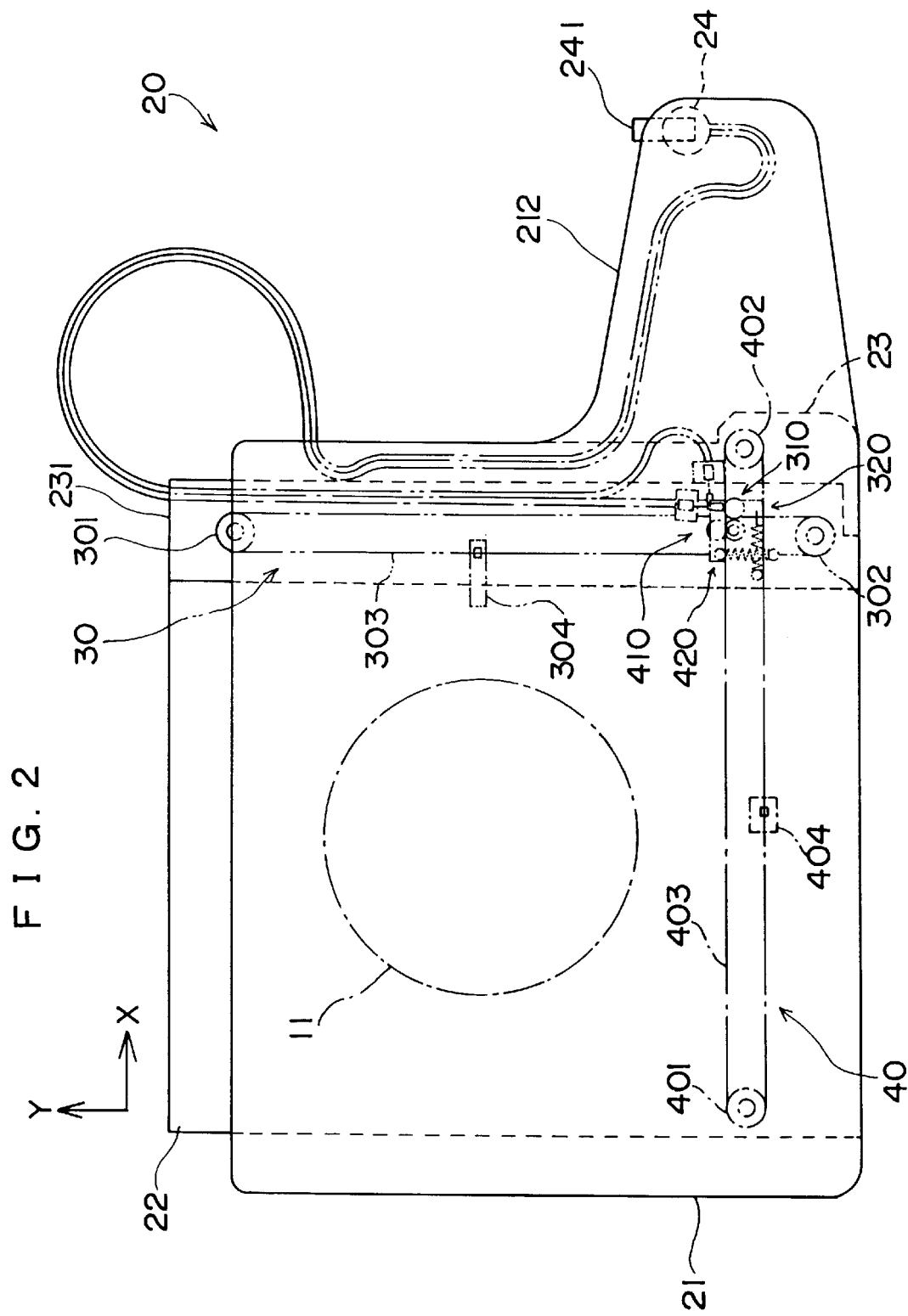
FIG. 2 is a plan view showing the above embodiment.

As shown in FIG. 2, the positioning stage 20 has the above-described table 21, a plate-shaped base 22 for supporting the table 21 and a sub-table 23 sandwiched therebetween.

The base 22 and the sub-table 23 are capable of relative movement in Y-axis direction. The sub-table 23 and the table 21 are capable of relative movement in X-axis direction. For defining respective relative movement direction, a guiding mechanism by a guide pin and a rail (not shown) extends in respective movement directions between the base 22 and the sub-table 23 and between the sub-table 23 and the table 21 respectively.

First feeding mechanism 30 is provided for relative movement of the base 22 and the sub-table 23 in Y-axis direction. And second feeding mechanism 40 is provided for relative movement of the sub-table 23 and the table 21 in X-axis direction. The respective feeding mechanisms mutually cross at an intermediate portion thereof at a lower right side in FIG. 2.

The first feeding mechanism 30 has a pair of pulley 301, 302 supported by the sub-table 23, and an endless belt 303 as a loop-shaped drive force transmitting member wound between the pulleys 301 and 302 and having at least a part thereof extending in Y-axis direction.

The pulleys 301 and 302 have a groove on a circumference thereof to prevent the belt 303 from falling off. The pulleys 301 and 302 may be an existing plastic component.

The belt 303 may be a transmission circular belt including fiber-filled rubber, metal wire etc.

A part of the belt 303 between the pulleys 301 and 302 extends in Y-axis direction. One of the portions of the belt 303 between the pulleys 301 and 302 is connected to the base 22 through a joint 304.

Accordingly, when the belt 303 wound between the pulleys circulatingly rotates, the joint 304 moves in Y-axis direction, so that the sub-table 23 moves in Y-axis direction relative to the base 22.

Figure 3:
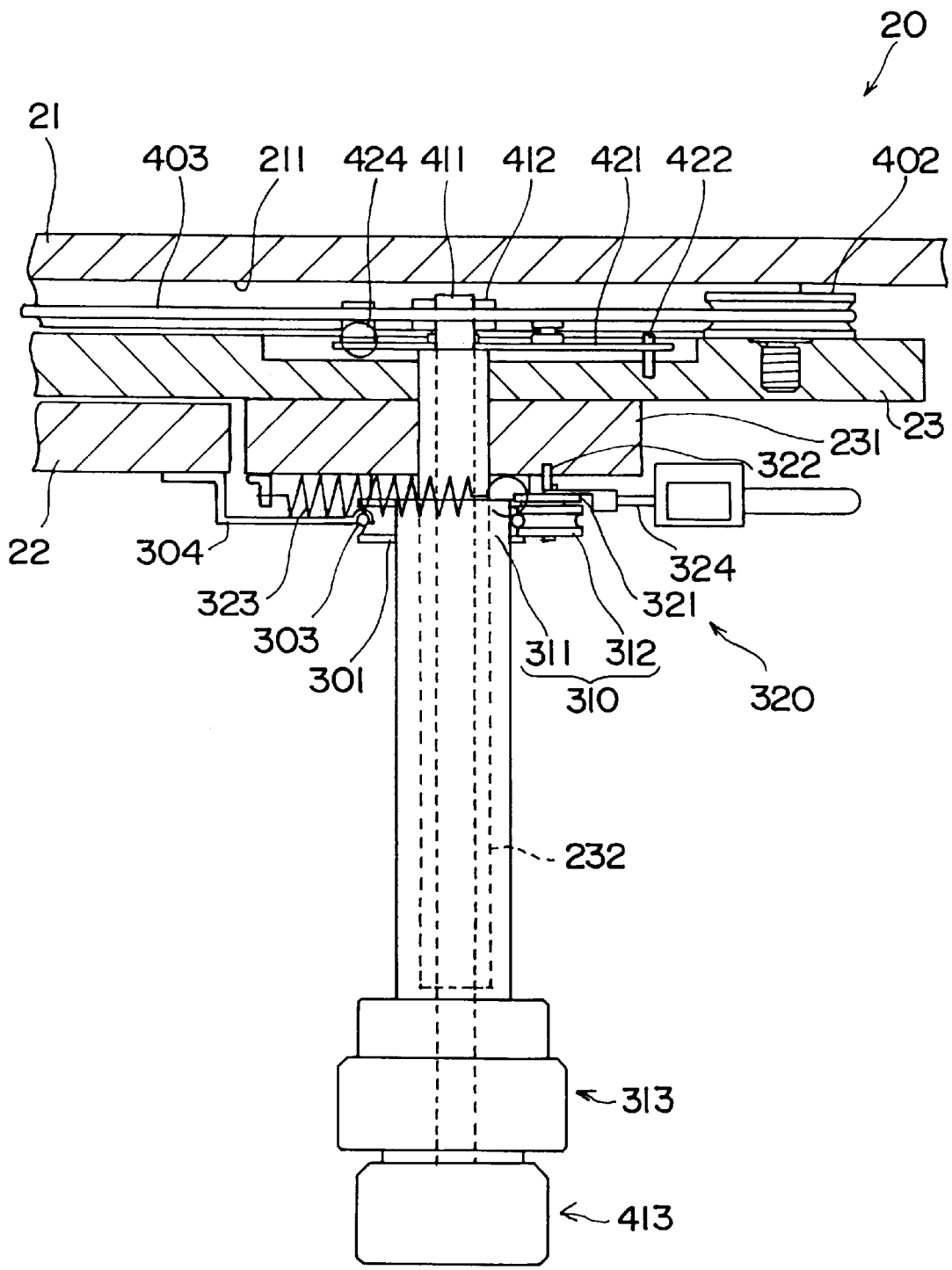
FIG. 3 is a vertical cross section showing the above embodiment.

As shown in FIG. 3, a plate 231 is stacked on a lower side of the sub-table 23. The pulleys 301 and 302 are supported on the lower side of the plate 231. The plate 231 is on the same height level as the base 22 and the joint 304 connecting the base 22 and the belt 303 is formed in a long arm-shape.

Figure 4:
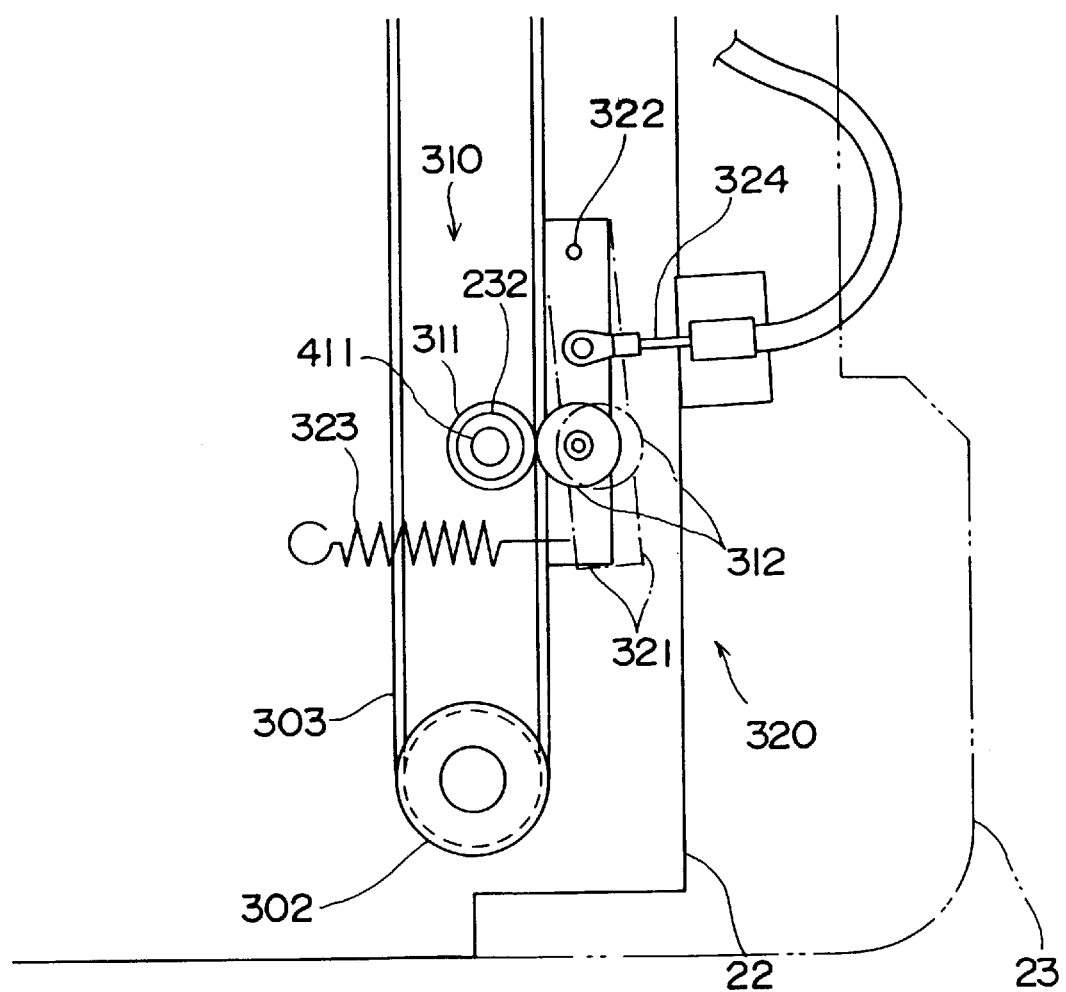
FIG. 4 is an enlarged plan view showing primary portion of the above embodiment.

As shown in FIG. 4, the first feeding mechanism 30 includes a pinch mechanism 310 for circulatingly rotating the belt 303.

The pinch mechanism 310 has a drive roller 311 and a follower roller 312 sandwiching the belt 303.

The drive roller 311 is rotatable around a cylindrical shaft 232 screwed into the sub-table 23 and the plate 231. The drive roller 311 extends in cylindrical shape in lower direction and a first manipulation knob 313 is formed at a distal end thereof.

The follower roller 312 is rotatably supported by a movable plate 321. An end of the movable plate 321 is supported by the plate 231 through a pin 322. A helical spring 323 is connected to the other end of the movable plate 321 so that the follower roller 312 is constantly biased toward the drive roller 311. The follower roller 312 and the drive roller 311 sandwich the belt 303 by the biasing force, which transmits the rotary movement of the drive roller 311 to the belt 303.

On the other hand, a cable 324 is connected to the movable plate 321. By pulling the cable 324, the movable plate 321 turns resisting against the biasing force of the helical spring 323, so that the follower roller 312 is separated from the drive roller 311. Accordingly, the drive force toward the belt 303 can be transmitted on and off. The movable plate 321, the helical spring 323 and the cable 324 constitute a release mechanism 320.

Back to FIG. 2, a second feeding mechanism 40 for moving the sub-table 23 and the table 21 relatively in X-axis direction has approximately the same arrangement as the first feeding mechanism 30.

The second feeding mechanism 40 has a pair of pulley 401, 402 supported by the sub-table 23, and an endless belt 403 as a loop-shaped drive force transmitting member wound between the pulleys 401 and 402 and having at least a part thereof extending in X-axis direction.

The pulleys 401 and 402 and the belt 403 are the same as the above-described pulleys 301 and 302 and the belt 303.

One of the portions of the belt 403 between the pulleys 401 and 402 is connected to the table 21 through a joint 404.

Accordingly, when the belt 403 wound between the pulleys circulatingly rotates, the joint 404 moves in X-axis direction, so that the sub-table 23 moves in X-axis direction relative to the table 21.

As shown in FIG. 3, a recess 211 is formed on a lower side of the table 21 to accommodate the pulleys 401 and 402 disposed on an upper side of the sub-table 23 and the belt 403. The joint 404 for associating the table 21 and the belt 403 is connected to a ceiling surface of the recess 211.

Figure 5:
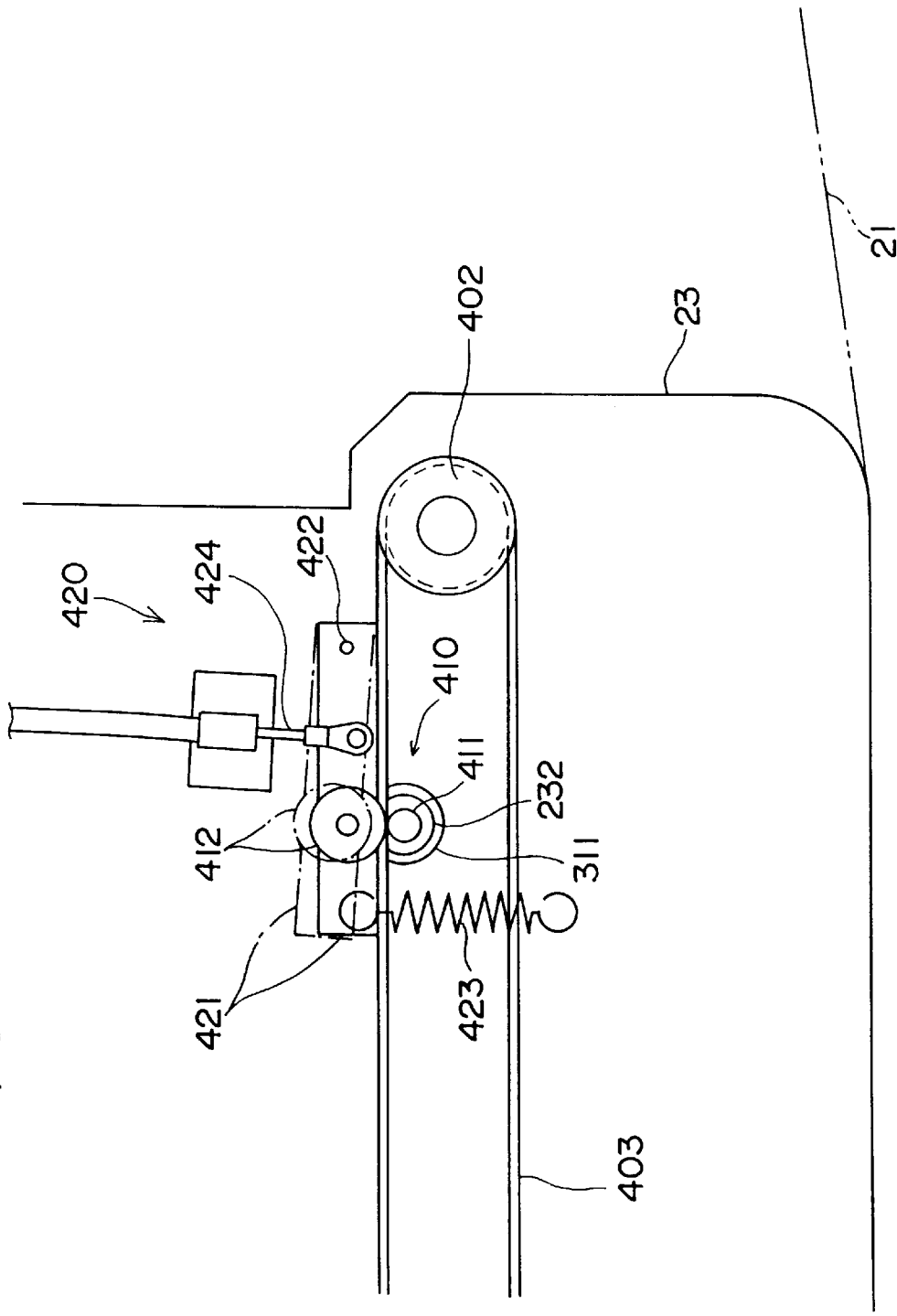
FIG. 5 is an enlarged plan view showing another primary portion of the above embodiment.

As shown in FIG. 5, the second feeding mechanism 40 includes a pinch mechanism 410 for circulatingly rotating the belt 403.

The pinch mechanism 410 has a drive roller 411 and a follower roller 412 sandwiching the belt 403.

The drive roller 411 is a shaft penetrating a center of the cylindrical shaft 232 screwed to the sub-table 23 and the plate 231 and is held rotatably. A second manipulation knob 413 is formed at a lower distal end of the drive roller 411.

The follower roller 412 is rotatably supported by a movable plate 421. An end of the movable plate 421 is supported by the sub-table 23 through a pin 422. A helical spring 423 is connected to the other end of the movable plate 421 so that the follower roller 412 is constantly biased toward the drive roller 411. The follower roller 412 and the drive roller 411 sandwich the belt 403 by the biasing force, which transmits the rotary movement of the drive roller 411 to the belt 403.

On the other hand, a cable 424 is connected to the movable plate 421. By pulling the cable 424, the movable plate 421 turns resisting against the biasing force of the helical spring 423, so that the follower roller 412 separates from the drive roller 411. Accordingly, the drive force toward the belt 403 can be transmitted on and off. The movable plate 421, the helical spring 423 and the cable 424 constitute a release mechanism 420.

As shown in FIG. 1, the table 21 has an extension 212 extending in right direction in the figure, and a grip 24 for coarse feed is provided at a distal end thereof. A release lever 241 for simultaneously releasing the above-described release mechanism 320 and 420 is provided to the grip 24.

As shown in FIG. 2, the cables 324 and 424 of the release mechanisms 320 and 420 are drawn out mutually in parallel and are disposed on lower side of the extension 212 while drawing large loop so as not to hinder mutual operation, which are then connected to the release lever 241.

The release lever 241 for pulling the cable 324 and 424 may be existing lever mechanism.

Figure 6:
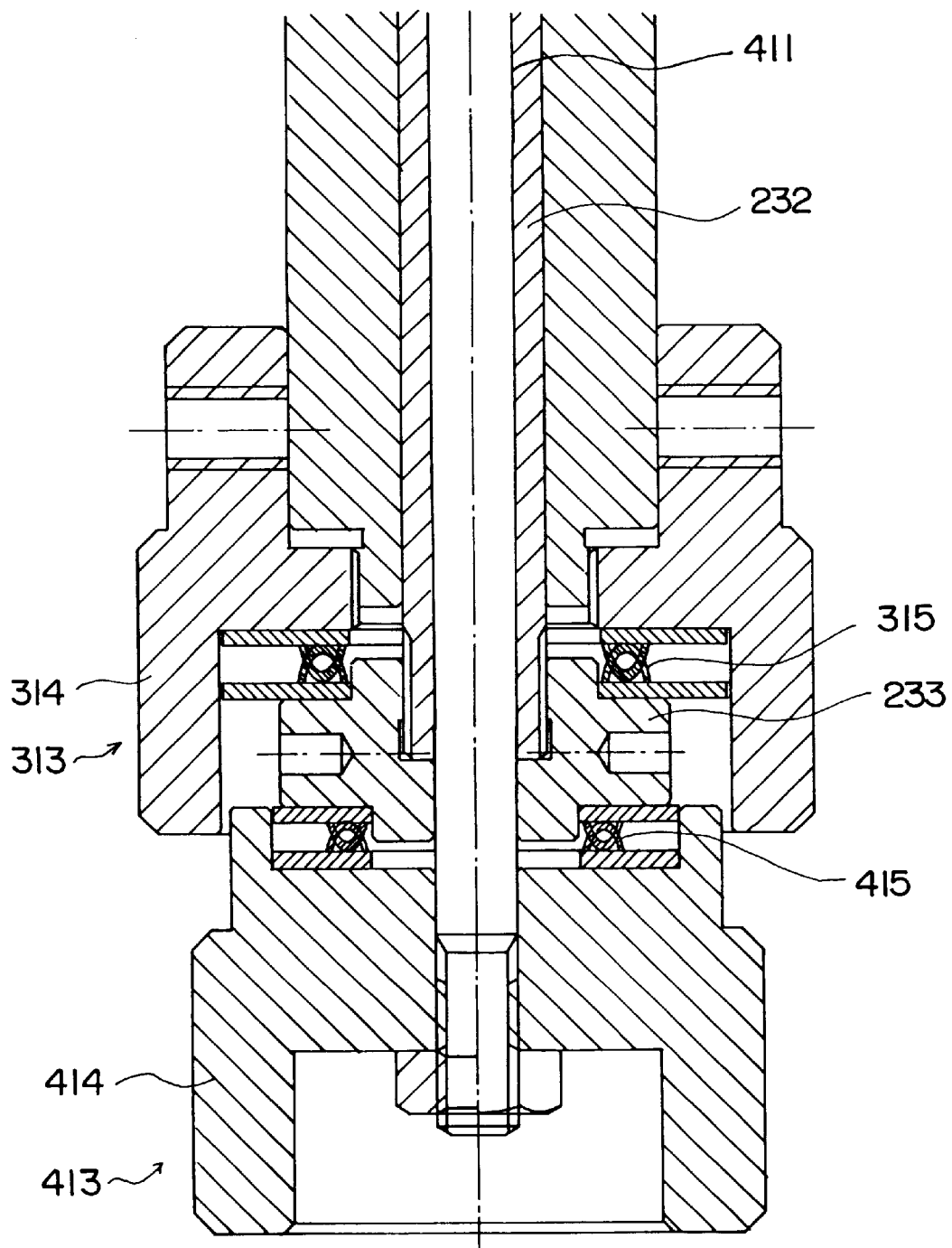
FIG. 6 is an enlarged cross section showing a manipulation knob of the above embodiment.

FIG. 6 shows an example of specific structure of the manipulation knob.

The shaft 232 is hollowed and is connected to an intermediate member 233. On an outside of the shaft 232, a lower cylindrical portion of the drive roller 311 is disposed coaxially relative to the shaft 232 and is connected to the manipulation knob 313. Similarly, on an inside of the shaft 232, a lower cylindrical portion of the drive roller 411 is disposed coaxially relative to the shaft 232 and is connected to the manipulation knob 413.

A friction member 315 composed of a thrust washer an a wave washer is disposed between the manipulation knob ring 314 and the intermediate member 233, and a holding force is applied to the manipulation knob ring 314 by an elastic force of these components.

In the present embodiment, following operation is conducted.

Initially, the wafer 11 is put on the table 21. Subsequently, the grip 24 is grasped and the release lever 241 is pulled to actuate the release mechanisms 320 and 420. Then, table 21 is coarsely fed by the grip 24 to let the wafer 11 visible, while looking into the eyepiece 15A.

Next, after releasing the grip 24 and the release lever 241, the release mechanisms 320 and 420 are let off, so that the first and the second feeding mechanisms 30 and 40 become effective. In this state, the wafer 11 is inspected while minutely feeding the manipulation knobs 413 and 313. Specifically, after inspecting the image of an area the wafer 11, the next area is subsequently inspected.

After inspecting the entire area, the grip 24 is grasped again and the release lever 241 is pulled to actuate the release mechanisms 320 and 420, so that the table 21 is moved to one side, thus facilitating to take the wafer 11 out.

According to the present embodiment, following effects can be obtained.

The belts 303 and 403 are driven not by the pulleys but by the pinch mechanisms 310 and 410, which can secure transmission of drive force by holding the belt. Accordingly, strong tension of the belt required for transmitting the rotation of the pulley and the belt is not necessary, so that size reduction and structure simplification of a portion around the pulleys 301, 302, 401 and 402 are possible.

Further, since the belt is not wound to the pinch mechanisms 310 and 410, the allowable minimum bend radius of the belts 303 and 403 does not influence on the pinch mechanism. Accordingly, the feed can be minimized by reducing radius of the drive roller.

Further, since the pinch mechanism 310 and 410 can be disposed at any section of the path of the belts 303 and 403, manipulation knobs 313 and 413 for feed operation can be freely disposed. Furthermore, when the feeding mechanisms are disposed in two directions crosswise, the feeding mechanisms can be crossed at any desired position, thus enabling to arrange the location of the feeding mechanisms more freely.

Since the pinch mechanisms 310 and 410 have an arrangement where the one of the drive rollers 311 and 411 is connected to the manipulation knobs 313 and 413, the drive roller can be directly driven, thus efficiently simplifying the arrangement and reducing the size thereof.

Since the pinch mechanisms 310 and 410 constitute the release mechanisms 320 and 420 capable of holding and driving the belts 303 and 403 by associating and separating the follower rollers 312 and 412 with the drive rollers 311 and 411, the release mechanism can be achieve with a simple structure using the characteristics of the pinch mechanism.

Since the first feeding mechanism 30 and the second feeding mechanism 40 mutually cross at respective intermediate position, not only the periphery of the table but also a space at the center of the table can be effectively utilized.

Further, since the pinch mechanisms 310 and 410 of respective feeding mechanisms 30 and 40 are disposed adjacent to the position where the respective feeding mechanisms are mutually crossed, the pinch mechanisms of respective feeding mechanisms can be concentrated at one position and the respective feeding mechanisms can be manipulated at the position, so that operability can be enhanced.

Especially, since the pinch mechanisms 310 and 410 of the respective feeding mechanisms 30 and 40 are coaxially disposed and the manipulation knobs 313 and 413 for rotatably controlling the respective drive rollers are arranged in a coaxial double cylinder, the manipulation of respective feeding mechanisms can be concentratingly conducted at one position, thus improving operability.

Incidentally, the scope of the present invention is not restricted to the above embodiment, but includes modifications shown below.

Though the pinch mechanisms 310 and 410 of the respective feeding mechanisms 30 and 40 in the above embodiment have the coaxially disposed drive rollers 311 and 411 and the coaxial double-cylindrical manipulation knobs 313 and 413 for rotatably controlling the respective drive rollers, the drive rollers and the manipulation knobs may not be coaxially provided, but may be arranged in parallel two shafts.

The drive rollers and the manipulation knobs 313 and 413 may be connected by a flexible shaft, so that the manipulation knobs can be more freely disposed to a desired location.

The manipulation knobs may not be driven manually but by an electronic motor. Accordingly, the pinch mechanism can be disposed to a position where manual operation is difficult.

Further, by providing a flywheel or a component having sufficient inertia to a part of the respective drive rollers or the manipulation knobs 313 and 413, a shift error caused by outside vibration or mistaken operation on account of unexpected contact can be prevented and operability can be improved during continuous operation.

Though the endless belts 303 and 403 are used as the loop-shaped drive force transmitting member in the above embodiment, the drive force transmitting member may be an approximate circle of a wire with ended configuration. For instance, when the wire is stretched so that both ends come on the joints 304 and 404, the same function as the endless belt can be obtained. Alternatively, the ended wire may be arranged in a loop and both ends thereof may be directly engaged to the table.

Though a groove is provided on the circumference of the drive rollers 311 and 411 to prevent the belt 303 and 403 from falling off, the groove may be formed on the follower rollers 312 and 412 side. Alternatively, when the pinch mechanisms are located adjacent to the pulleys 301 to 402 and the belts are unlikely to fall off, the groove may not be formed. Further alternatively, the groove may be formed on both rollers.

The release lever 241 of the release mechanisms 320 and 420 may not be provided on the grip 24 but may be provided on the other location. The release mechanisms 320 and 420 may not be manually operated by the release lever 241 but may be operated by an electromagnetic means such as solenoid.

In the pinch mechanisms 310 and 410, the follower rollers 312 and 412 may not be biased by the helical springs 324 and 424 but the drive rollers 311 and 411 may be biased. However, as described above, the structure can be simplified by biasing the follower rollers.

Further, though the drive rollers 311 and 411 and the follower rollers 312 and 412 of the pinch mechanisms 310 and 410 are arranged on the same line orthogonal with the belts 303 and 403, the drive rollers and the follower rollers may not be disposed on the same orthogonal line, but may be disposed on a different line orthogonal with the belts 303 and 403, so that friction area can be increased to conduct reliable feed.

What is claimed is:

1. A positioning stage comprising: a table for a workpiece to be rested; a base for supporting the table; and a feeding mechanism interposed between the table and the base for moving the table relative to the base in a predetermined movement direction along a surface of the table, the feeding mechanism comprising:
   a pair of pulley supported by either one of the table and the base;
   a loop-shaped drive force transmission member stretched between the pair of pulley, at least a part of the drive force transmission member extending in the movement direction;
   a joint for connecting the other one of the table and the base with a part of the drive force transmission member extending in the movement direction; and
   a pinch mechanism provided to the either one of the table and the base for holding a part of the drive force transmission member to drive the drive force transmission member.

2. The positioning stage according to claim 1, wherein the pinch mechanism has a drive roller and a follower roller sandwiching the drive force transmission member, and wherein a manipulation knob capable of being rotatably operated from an outside is connected to the drive roller.

3. The positioning stage according to claim 2, wherein the pinch mechanism has a release mechanism capable of releasing hold and drive of the drive force transmission member by associating and separating the follower roller relative to the drive roller.

4. A positioning stage, comprising:
   a table for a workpiece to be rested;
   a base for supporting the table;
   a sub-table interposed between the base and the table;
   a first feeding mechanism disposed between the base and the sub-table for moving the sub-table relative to the base in a first predetermined movement direction along a surface of the sub-table;
   a second feeding mechanism disposed between the sub-table and the table for moving the table relative to the sub-table in a second predetermined movement direction along a surface of the table; each of the first and the second feeding mechanisms comprising:
   a pair of pulleys supported by a first support;
   a loop-shaped drive force transmission member stretched between the pair of pulleys, at least a part of the drive force transmission member extending in a movement direction of a second support, different from the first support;
   a joint for connecting the second support with a part of the drive force transmission member extending in the movement direction; and
   a pinch mechanism provided on the first support for holding a part of the drive force transmission member to drive the drive force transmission member, wherein in the first feeding mechanism, the first support is one of the base and the sub-table, and the second support is an other one of the base and the sub-table, and in the second feeding mechanism, the first support is one of the sub-table and the table and the second support is an other one of the sub-table and the table.

5. The positioning stage according to claim 4, wherein the first and the second feeding mechanisms are disposed in two movement directions mutually crosswise, the feeding mechanisms mutually crossing at an intermediate section thereof.

6. The positioning stage according to claim 5, wherein the pinch mechanism of each of the first and the second feeding mechanisms is provided adjacent to the position where the first and the second feeding mechanisms are crossed.

7. The positioning stage according to claim 6, wherein the pinch mechanism of each of the first and the second feeding mechanisms with the movement direction thereof crossed has a drive roller and a follower roller sandwiching the drive force transmission member, a first drive roller of the first feeding mechanism and a second drive roller of the second feeding mechanism being coaxially disposed, and a manipulation knob for controllably rotating the respective drive rollers being coaxially formed.

8. The positioning stage according to claim 7, the manipulation knob further comprising:
   a shaft;
   an intermediate member fixed to the shaft;
   a first manipulation knob ring connected to the first drive roller, the first manipulation knob ring coaxially and rotatably disposed relative to the intermediate member, and coupled to the intermediate member through a first friction member; and
   a second manipulation knob ring connected to the second drive roller, the second manipulation knob ring coaxially and rotatably disposed relative to the intermediate member, and coupled to the intermediate member through a second friction member.

* * * * *